US012523067B2

(12) United States Patent
Avgerinos et al.

(10) Patent No.: US 12,523,067 B2
(45) **Date of Patent: *Jan. 13, 2026**

(54) LOCKING ASSEMBLY FOR SLIDING DOORS

(71) Applicant: Schlage Lock Company LLC, Carmel, IN (US)

(72) Inventors: Paul Avgerinos, Carmel, IN (US); Paul R. Arlinghaus, Fishers, IN (US); Maria Shields, Indianapolis, IN (US); Justin D. Seacat, Carmel, IN (US); Bradley Ritchie, Whitestown, IN (US); Brady Plummer, Fishers, IN (US)

(73) Assignee: Schlage Lock Company LLC, Carmel, IN (US)

(*) Notice: Subject to any disclaimer, the term of this patent is extended or adjusted under 35 U.S.C. 154(b) by 28 days.

This patent is subject to a terminal disclaimer.

(21) Appl. No.: 18/675,939

(22) Filed: May 28, 2024

(65) Prior Publication Data

US 2025/0129636 A1 Apr. 24, 2025

Related U.S. Application Data

(63) Continuation of application No. 17/425,650, filed as application No. PCT/US2020/015163 on Jan. 27, 2020, now Pat. No. 11,993,957.

(Continued)

(51) Int. Cl.
*E05B 65/08* (2006.01)
*E05B 9/08* (2006.01)
(Continued)

(52) U.S. Cl.
CPC ............ *E05B 65/0864* (2013.01); *E05B 9/08* (2013.01); *E05B 47/0012* (2013.01);
(Continued)

(58) Field of Classification Search
CPC ...... E05B 65/00; E05B 65/08; E05B 65/0864; E05B 9/00; E05B 9/08; E05B 47/00;
(Continued)

(56) References Cited

U.S. PATENT DOCUMENTS 2,701,896 A * 2/1955 Fritz ..................... E05D 15/165 49/225
2,882,183 A * 4/1959 Bond ....................... C09J 7/201 174/120 SR (Continued)

OTHER PUBLICATIONS

International Search Report; ISA/US; International Application No. PCT/US2020/015163; Apr. 1, 2020; 2 pages.

(Continued)

*Primary Examiner* — Nathan Cumar
(74) *Attorney, Agent, or Firm* — Taft Stettinius & Hollister LLP

(57) ABSTRACT

An exemplary method includes placing a first adhesive on a first surface of a strike plate, wherein the strike plate includes a pocket extending into a second surface of the strike plate opposite the first surface of the strike plate. The method further includes placing a second adhesive on a first surface of a lock module, wherein the lock module includes a bolt operable to extend beyond a second surface of the lock module. The method further includes aligning the pocket with the bolt such that the bolt is operable to extend into the pocket; and with the pocket and the bolt aligned with one another, releasably joining the strike plate and the lock module with a releasable coupler, thereby forming an aligned locking assembly.

20 Claims, 9 Drawing Sheets

Related U.S. Application Data

(60) Provisional application No. 62/796,783, filed on Jan. 25, 2019.

(51) Int. Cl.
*E05B 47/00* (2006.01)
*E05B 63/00* (2006.01)
*G07C 9/00* (2020.01)

(52) U.S. Cl.
CPC ...... *E05B 63/0069* (2013.01); *G07C 9/00182* (2013.01); *E05B 2047/0016* (2013.01); *E05B 2047/0017* (2013.01); *E05B 2047/002* (2013.01); *E05B 2047/0036* (2013.01); *G07C 2009/0019* (2013.01)

(58) Field of Classification Search
CPC .......... E05B 47/0012; E05B 2047/0016–0018; E05B 2047/002; E05B 2047/0036; E05B 63/00; E05B 63/0069; G07C 9/00; G07C 9/00182; G07C 2009/0019
USPC .............................................................. 70/99
See application file for complete search history.

(56) References Cited

U.S. PATENT DOCUMENTS

| | | | | | |
|---|---|---|---|---|---|
| 2,931,434 | A * | 4/1960 | Steel | E05D 15/0669 | 49/63 |
| 3,102,411 | A * | 9/1963 | Friedman | E05C 5/02 | 292/62 |
| 3,745,706 | A * | 7/1973 | Stermac | E05D 15/066 | 49/404 |
| 4,229,905 | A * | 10/1980 | Rush | E06B 3/4609 | 49/471 |
| 4,415,615 | A * | 11/1983 | Esmay | C09J 133/06 | 428/41.5 |
| 4,887,390 | A * | 12/1989 | Boyko | B60J 5/06 | 49/214 |
| 5,409,271 | A * | 4/1995 | Hoffmann | E05B 63/0004 | 292/DIG. 47 |
| 5,421,627 | A * | 6/1995 | Yane | E05B 1/0015 | 292/101 |
| 5,622,007 | A * | 4/1997 | Archer | E05F 1/16 | 49/404 |
| 5,906,071 | A * | 5/1999 | Buchanan, Jr. | E05F 15/638 | 49/214 |
| 6,231,962 | B1 * | 5/2001 | Bries | A47G 1/175 | 428/317.1 |
| 6,413,626 | B1 * | 7/2002 | Wollner | C09J 7/20 | 301/5.21 |
| 6,422,287 | B1 * | 7/2002 | Wilke | E05D 15/58 | 160/195 |
| 6,471,258 | B1 * | 10/2002 | Bombuy Perich | E05B 65/0811 | 292/173 |
| 6,874,825 | B1 * | 4/2005 | Rauner | E05C 5/02 | 292/61 |
| 7,781,056 | B2 * | 8/2010 | Bries | B32B 5/18 | 428/317.1 |
| 8,585,105 | B1 * | 11/2013 | Dobbins, Sr. | E05C 19/166 | 49/360 |
| 8,881,557 | B2 * | 11/2014 | McEachern | E05C 17/60 | 292/296 |
| 8,925,982 | B2 * | 1/2015 | Bliding | G07C 9/00944 | 292/144 |
| 9,394,728 | B2 * | 7/2016 | Tomaszewski | E05B 81/34 | |
| 9,404,288 | B2 * | 8/2016 | Curtis | E06B 3/4415 | |
| 9,546,505 | B1 * | 1/2017 | McEachern | E05C 17/60 | |
| 9,617,765 | B1 * | 4/2017 | Lawrence | E05B 65/0864 | |
| 9,790,736 | B2 * | 10/2017 | Kincaid | G08B 13/08 | |
| 9,856,058 | B1 * | 1/2018 | Arthurs | E05F 1/02 | |
| 9,856,676 | B2 * | 1/2018 | Leontaridis | E05B 35/008 | |
| 11,993,957 | B2 * | 5/2024 | Avgerinos | E05B 65/0864 | |
| 2007/0086866 | A1 | 4/2007 | Shute et al. | | |
| 2008/0224886 | A1 | 9/2008 | Rodriguez et al. | | |
| 2009/0193859 | A1 * | 8/2009 | Kwon | E05B 47/026 | 70/91 |
| 2013/0081434 | A1 * | 4/2013 | Grant | E05B 47/02 | 70/1.5 |
| 2013/0222110 | A1 * | 8/2013 | Nardelli | E05B 47/02 | 340/5.61 |
| 2013/0269403 | A1 * | 10/2013 | Kowalczyk | E05B 47/0603 | 292/96 |
| 2014/0353982 | A1 | 12/2014 | Wei | | |
| 2016/0002957 | A1 * | 1/2016 | Trinh | E05B 63/0052 | 70/85 |
| 2016/0369539 | A9 | 12/2016 | Liang et al. | | |
| 2017/0051544 | A1 * | 2/2017 | Bertelli | E05B 47/023 | |
| 2017/0204636 | A1 * | 7/2017 | Sack | G07C 9/00309 | |
| 2018/0023321 | A1 * | 1/2018 | Van Landingham, Jr. | E05B 15/1607 | 70/280 |
| 2018/0066449 | A1 * | 3/2018 | Kamody | E05B 15/0245 | |
| 2018/0148960 | A1 * | 5/2018 | Finley | E05C 19/003 | |
| 2018/0160835 | A1 * | 6/2018 | Garrity | E05B 47/0001 | |

OTHER PUBLICATIONS

Written Opinion of the International Searching Authority; ISA/US; International Application No. PCT/US2020/015163; Apr. 1, 2020; 5 pages.

Smart Armor Cube; Jun. 26, 2018; 8 pages; https://smartarmorcube.com/features/.

Safety 1st; Adhesive Magnetic Lock System—4 Locks and 1 Key; Jun. 26, 2018; 11 pages; Copyright 2018 Safety 1st.

* cited by examiner

LOCKING ASSEMBLY FOR SLIDING DOORS

CROSS-REFERENCE TO RELATED APPLICATIONS

The present application is a continuation of U.S. patent application Ser. No. 17/425,650 filed Jul. 23, 2021 and issued as U.S. Pat. No. 11,993,957, which is a U.S. National Phase of International PCT Application No. PCT/US2020/015163 filed Jan. 27, 2020, which claims the benefit of U.S. Provisional Patent Application No. 62/796,783 filed Jan. 25, 2019, the contents of each application are incorporated by reference in their entirety.

TECHNICAL FIELD

The present disclosure generally relates to sliding door locks, and more particularly but not exclusively relates to door locks for glass sliding doors.

BACKGROUND

While sliding doors typically have a primary locking mechanism to keep the door closed, it may occasionally be desirable to retrofit such doors with a secondary locking mechanism. The development of a lock that can be used on different formats of sliding doors has been hindered, however, due to the fact that each manufacturer typically has a unique configuration for the frame of the sliding door. Although the pane fitted within the frame retains a relatively constant configuration from manufacturer to manufacturer, it is typically not desirable to modify the pane (e.g., by drilling into the pane), as this can adversely affect the structural integrity of the glass. For these reasons among others, there remains a need for further improvements in this technological field.

SUMMARY

An exemplary method includes placing a first adhesive on a first surface of a strike plate, wherein the strike plate includes a pocket extending into a second surface of the strike plate opposite the first surface of the strike plate. The method further includes placing a second adhesive on a first surface of a lock module, wherein the lock module includes a bolt operable to extend beyond a second surface of the lock module. The method further includes aligning the pocket with the bolt such that the bolt is operable to extend into the pocket; and with the pocket and the bolt aligned with one another, releasably joining the strike plate and the lock module with a releasable coupler, thereby forming an aligned locking assembly. Further embodiments, forms, features, and aspects of the present application shall become apparent from the description and figures provided herewith.

DETAILED DESCRIPTION OF ILLUSTRATIVE EMBODIMENTS

Figure 1:
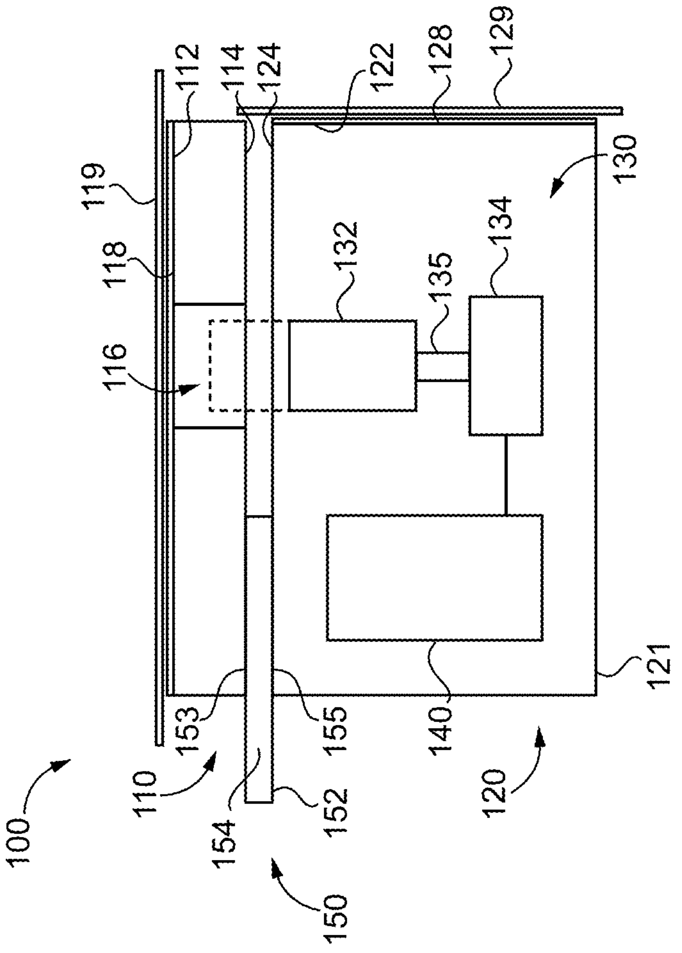
FIG. 1 is a schematic illustration of a pre-aligned locking assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown certain in specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a locking assembly 100 according to certain embodiments. The locking assembly 100 generally includes a strike plate 110 and a lock module 120. As described herein, the locking assembly 100 may be provided as a pre-aligned locking assembly 100 in which the strike plate 110 and the lock module 120 are releasably joined to one another at the time of sale to an end user, such as by a releasable coupler 150 that is removed during the installation process.

The strike plate 110 has a first surface 112 and an opposite second surface 114, and a pocket 116 is defined at least in the second surface 114. The pocket 116 may extend through the strike plate 110 to the first surface 112. The first surface 112 of the strike plate 110 is provided with a first adhesive 118, which may be covered with a first removable protective film 119.

The lock module 120 generally includes a housing 121, a locking mechanism 130 mounted in the housing 121, and a control assembly 140 in communication with the locking mechanism 130. The housing 121 defines a first surface 122 and a second surface 124 that faces the second surface 114 of the strike plate 110. While other arrangements are contemplated, in the illustrated form, the first lock module surface 122 and the second lock module surface 124 are perpendicular to one another. The first surface 122 of the lock module 120 is provided with a second adhesive 128, which may be covered with a second removable protective film 129.

The locking mechanism 130 generally includes a bolt 132 having an unlocking position and a locking position (in phantom), and an electronic actuator 134 operable to drive the bolt 132 between the locking position and the unlocking position based upon signals received from the control assembly 140. In the unlocking position, the bolt 132 is received within the housing 121. In the locking position, the bolt 132 projects beyond the second lock module surface 124. The pocket 116 is aligned with the bolt 132 such that the bolt 132 extends into the pocket 116 when the bolt 132 is in the locking position. As described herein, this alignment may be retained by the releasable coupler 150 until the locking assembly 100 is installed.

In the illustrated form, the electronic actuator 134 is provided as a linear actuator including a reciprocating shaft 135 that is coupled with the bolt 132 such that the actuator 134 is operable to linearly drive the bolt 132 between its locking and unlocking positions. In certain forms, the linear actuator 134 may comprise a rotary motor that rotates a rotor to cause reciprocal motion of the shaft 135 and the bolt 132. It is also contemplated that the motor may be configured to drive the bolt 132 between its locking and unlocking positions in another manner. For example, the motor may rotate the bolt 132 between a locking position and an unlocking position, or may linearly drive the bolt through one or more gears, such as via a rack and pinion arrangement. In certain forms, the electronic actuator 134 may be omitted, and the bolt 132 may be manually driven between its locking and unlocking positions.

Figure 2:
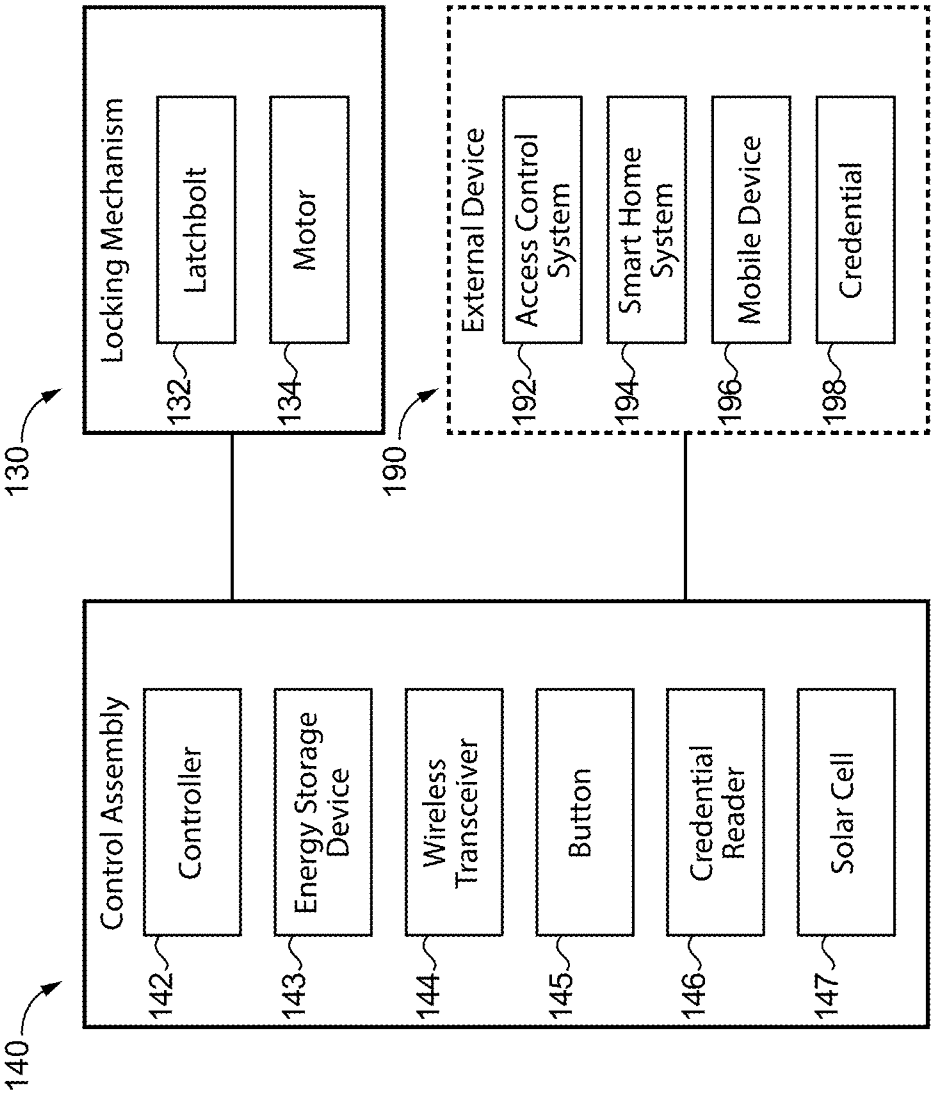
FIG. 2 is a schematic block diagram of the locking assembly illustrated in FIG. 1.

With additional reference to FIG. 2, the control assembly 140 generally includes a controller 142 and an energy storage device 143, and may further include one or more of a wireless transceiver 144, a button 145, a credential reader 146, and/or a solar cell 147. The controller 142 is operable to cause the actuator 134 to drive the bolt 132 between its locking and unlocking positions, for example by powering the actuator 134 using electrical power drawn from the energy storage device 143, which may be provided as a battery or a supercapacitor. As described herein, the controller 142 may control operation of the actuator 134 based upon information received from the wireless transceiver 144, the button 145, and/or the credential reader 146. In embodiments that include the solar cell 147, the solar cell 147 may be mounted to the housing 121 and configured to charge the energy storage device 143. Alternatively, the solar cell 147 may be mounted to the strike plate 110, and may transmit electrical power to the energy storage device 143 when the door is closed and the strike plate 110 is in close proximity to the lock module 120. In certain forms, the control assembly 140 may be in communication with one or more external devices 190, such as an access control system 192, a smart home system 194, a mobile device 196, or a credential 198.

In embodiments that include the wireless transceiver 144, the wireless transceiver 144 may facilitate communication between the controller 142 and one or more of the access control system 192, the smart home system 194, and/or the mobile device 196. The controller 142 may control operation of the locking assembly 130 based upon information received via the wireless transceiver 144. As one example, the controller 142 may alter the locked/unlocked state of the locking assembly 130 based upon commands and/or schedules received from the access control system 192, the smart home system 194, and/or the mobile device 196.

In embodiments that include the button 145, the controller 142 may control operation of the locking assembly 130 based upon information received from the button 145. For example, pressing the button 145 while the bolt 132 is in its locking position may cause the controller 142 to control the locking mechanism 130 to drive the bolt 132 to its unlocking position. As another example, when the bolt 132 is in its unlocking position, pressing the button 145 may cause the controller 142 to wait a predetermined period before returning the bolt 132 to its locking position. This delay time may enable a user to exit through the door and close the door before the relock is initiated. In certain forms, the control assembly 140 may include a door position sensor operable to sense when the door is in the closed position, and the controller 142 may initiate the relock based at least in part upon the door position sensor indicating that the door is in the closed position. In other embodiments, the relock delay may simply be based upon a predetermined time having elapsed following the activation of the button 145.

In embodiments that include the credential reader 146, the controller 142 may control operation of the locking mechanism 130 based upon information received via the credential reader 146. For example, upon presentation of an appropriate credential 198 (e.g., a proximity card, a fob, or a biometric credential), the controller 142 may cause the locking mechanism 130 to move the bolt 132 between its locking and unlocking positions.

As noted above, the strike plate 110 and the lock module 120 may be releasably coupled to one another by a releasable coupler 150 that retains alignment of the pocket 116 and the bolt 132 until the locking assembly 100 is at least partially installed. In certain embodiments, the coupler 150 may be applied to the locking assembly during the manufacturing and assembly stage such that the end user receives the locking assembly 100 with the strike plate 110 and the lock module 120 releasably coupled to one another. Provided below are further details regarding exemplary processes for manufacturing, assembling, and installing locking assemblies along the lines of the locking assembly 100.

In the illustrated form, the releasable coupler 150 is provided in the form of one or more removable double-sided adhesive strips 152. Each double-sided adhesive strip 152 includes a first adhesive side 153 and a second adhesive side 155, and may further include a foam layer 154 positioned between the first and second adhesive sides 153, 155. During assembly and in any appropriate order, the bolt 132 is aligned with the pocket 116, the first adhesive side 153 is adhered to the second strike plate surface 114, and the second adhesive side 155 is adhered to the second lock module surface 124, thereby releasably coupling the strike plate 110 and the lock module 120. The adhesive strips 152 retain the alignment of the pocket 116 and the bolt 132 to provide the end user with a pre-aligned lock assembly 100. In certain forms, the double-sided adhesive strips 152 may be of the type commercially available from 3M under the trade name COMMAND™ strips.

As noted above, the illustrated releasable coupler 150 is provided in the form of one or more removable double-sided adhesive strips 152. It is also contemplated that the releasable coupler 150 may include various additional or alternative features. By way of example, the releasable coupler 150 may include magnets, temporary pins or screws, rails, detents, snap features, or the like. In general, however, the releasable coupler 150 is operable to retain the alignment of the pocket 116 and the bolt 132 until the time of installation, and provides for simple decoupling of the strike plate 110 and the lock module 120 during the installation process.

Figure 3:
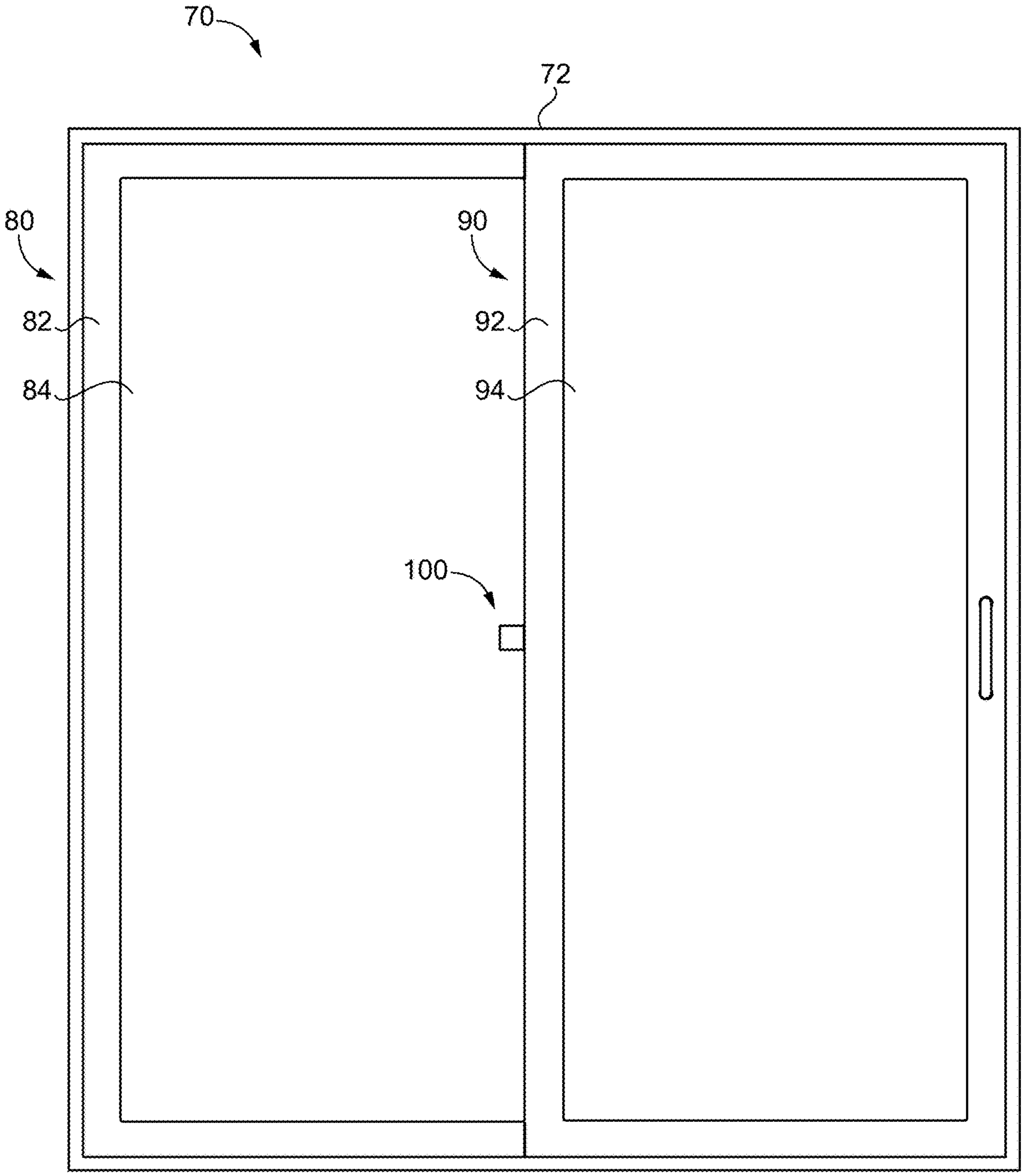
FIG. 3 is a front view of a closure assembly including the locking assembly illustrated in FIG. 1.

With additional reference to FIG. 3, illustrated therein is a closure assembly 70 according to certain embodiments. The closure assembly 70 generally includes a doorframe 72 having a first panel 80 and a second panel 90 mounted therein, and further includes the locking assembly 100, which selectively prevents relative movement of the first panel 80 and the second panel 90.

The first panel 80 includes a first panel frame 82 and a first glass pane 84 mounted within the frame 82. Similarly, the second panel 90 includes a second panel frame 92 and a second glass pane 94 mounted within the frame 94. At least one of the first panel 80 or the second panel 90 is slidable relative to the doorframe 72 between a closed position and an open position. While other forms are contemplated, in the illustrated embodiment, the first panel 80 is a fixed panel having a fixed position within the doorframe 72, and the second panel 90 is a movable panel operable to slide laterally within the doorframe 72. More particularly, the second or movable panel 90 is operable to slide from a closed position (to the right in FIG. 3) to an open position (to the left in FIG. 3). Thus, the closure assembly 70 has a closed condition in which the movable panel 90 is in its closed position, and an open condition in which the movable panel 90 is in its open position.

Figure 4:
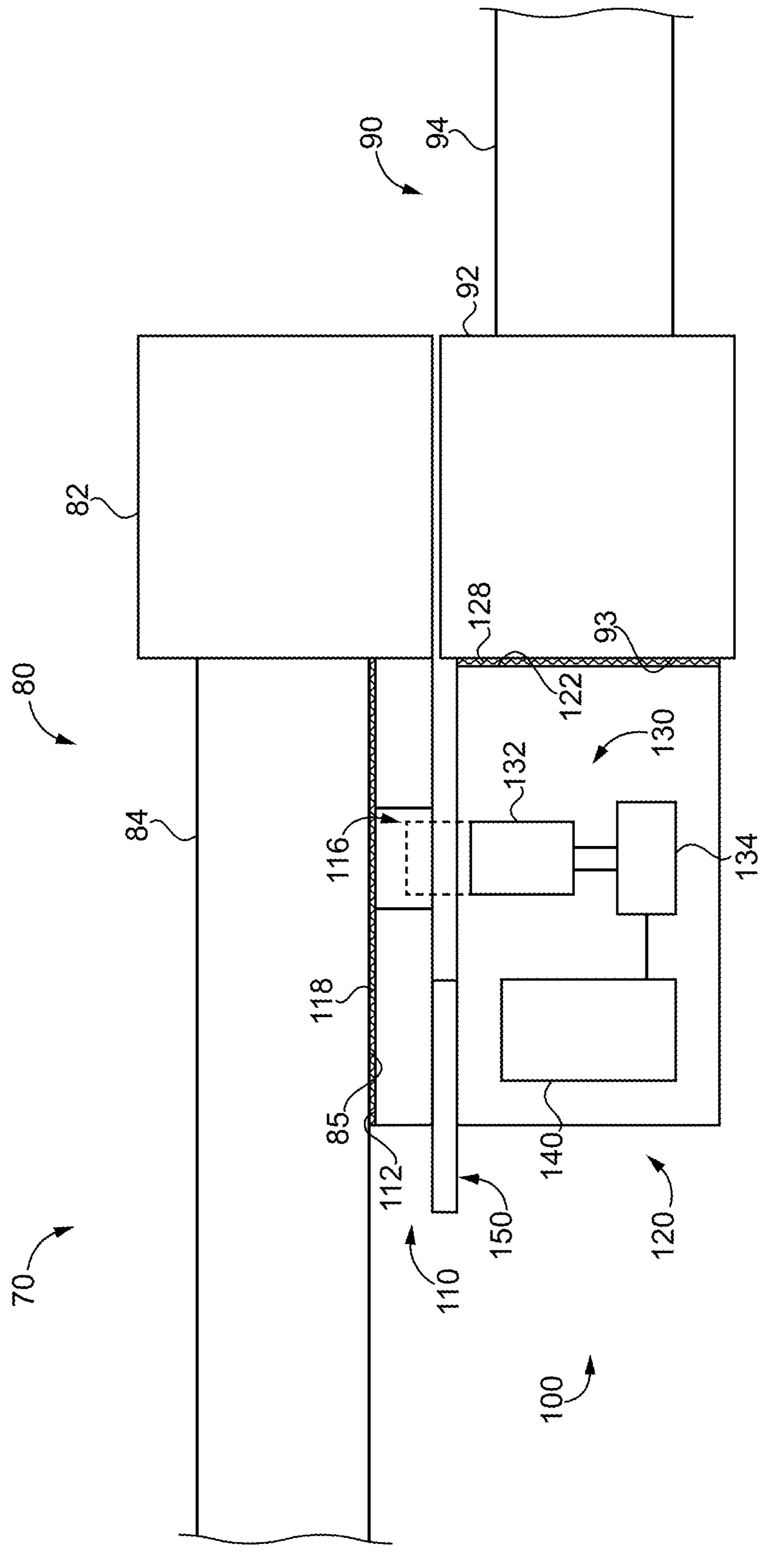
FIG. 4 is a schematic plan view of a portion of the closure assembly illustrated in FIG. 3.

With additional FIG. 4, illustrated therein is the locking assembly 100 partially installed to the closure assembly 70. The installation process begins with the locking assembly 100 in its pre-aligned configuration, in which alignment between the pocket 116 and the bolt 132 is maintained by the releasable coupler 150. The installer removes the protective films 119, 129 from the adhesive regions 118, 128 and, with the closure assembly 70 in its closed condition, mounts the pre-aligned locking assembly 100 to the panels 80, 90. More particularly, the first surface 112 of the strike plate 110 is adhered to the front face 85 of the first pane 84 by the first adhesive 118, and the first surface 122 of the lock module 120 is adhered to the end face 93 of the second frame 92 by the second adhesive 128. In the illustrated form, the strike plate 110 is adhered to the pane 84 of the fixed panel 80, and the lock module 120 is adhered to the frame 92 of the movable panel 90. It is also contemplated that this arrangement may be reversed, for example in embodiments in which the movable panel 90 is positioned on the outer side of the closure assembly 70.

Due to the provision of the releasable coupler 150, once the locking assembly 100 has been mounted to the panels 80, 90 in the manner described above, the pocket 116 of the strike plate 110 is pre-aligned with the bolt 132 of the lock module 120 when the closure assembly 70 is in its closed condition. As a result, the need for the installer to manually align the pocket 116 and the bolt 132 is obviated. Subsequent to installation of the pre-aligned locking assembly 100, the installer may then remove the releasable coupler 150 in any appropriate manner to release the strike plate 110 from the lock module 120. For example, in embodiments in which the releasable coupler 150 is provided in the form of removable double-sided adhesive strips 152 such as COMMAND™ strips, removing the releasable coupler 150 may involve pulling an exposed portion of the adhesive strip 152 to remove the strip 152 from the gap between the second surfaces 114, 124.

With the locking assembly 100 installed to the closure assembly 70, the locking assembly 100 is operable to selectively retain the closure assembly 70 in the closed condition. More particularly, when the closure assembly 70 is in the closed condition, the bolt 132 is operable to project into the pocket 116 to prevent relative movement of the strike plate 110 and lock module 120, thereby preventing relative movement of the panels 80, 90. By contrast, when the bolt 132 is in its unlocking position, relative movement of the strike plate 110 and lock module 120 is permitted, thereby permitting opening of the closure assembly 70. Thus, when in the closed condition, the closure assembly 70 has a locked state in which the locking assembly 100 retains the closure assembly 70 in the closed condition, and an unlocked state in which the locking assembly 100 does not retain the closure assembly 70 in the closed condition. As will be appreciated, the control assembly 140 may cause the locking mechanism 130 to move the bolt 132 between its locking and unlocking positions based upon one or more of the criteria described above.

In addition to or as a result of facilitating installation, the releasable coupler 150 may provide the locking assembly 100 with additional advantages. For example, due to the fact that the locking assembly 100 is provided to the installer in a pre-aligned configuration, features that may otherwise be required to account for misalignment of the pocket 116 and the bolt 132 may be omitted. As one example, the bolt 132 may be provided with a flat end face, as opposed to tapering to a tip, which may increase the degree to which the locking assembly 100 is able to resist relative movement of the panels 80, 90 when the locking assembly 100 is in the locking state. Similarly, the pocket 116 and the bolt 132 may be formed with less of a difference between the outer diameter of the bolt 132 and the inner diameter of the pocket 116, which may similarly increase the holding force provided by the locking assembly 100.

Figure 5:
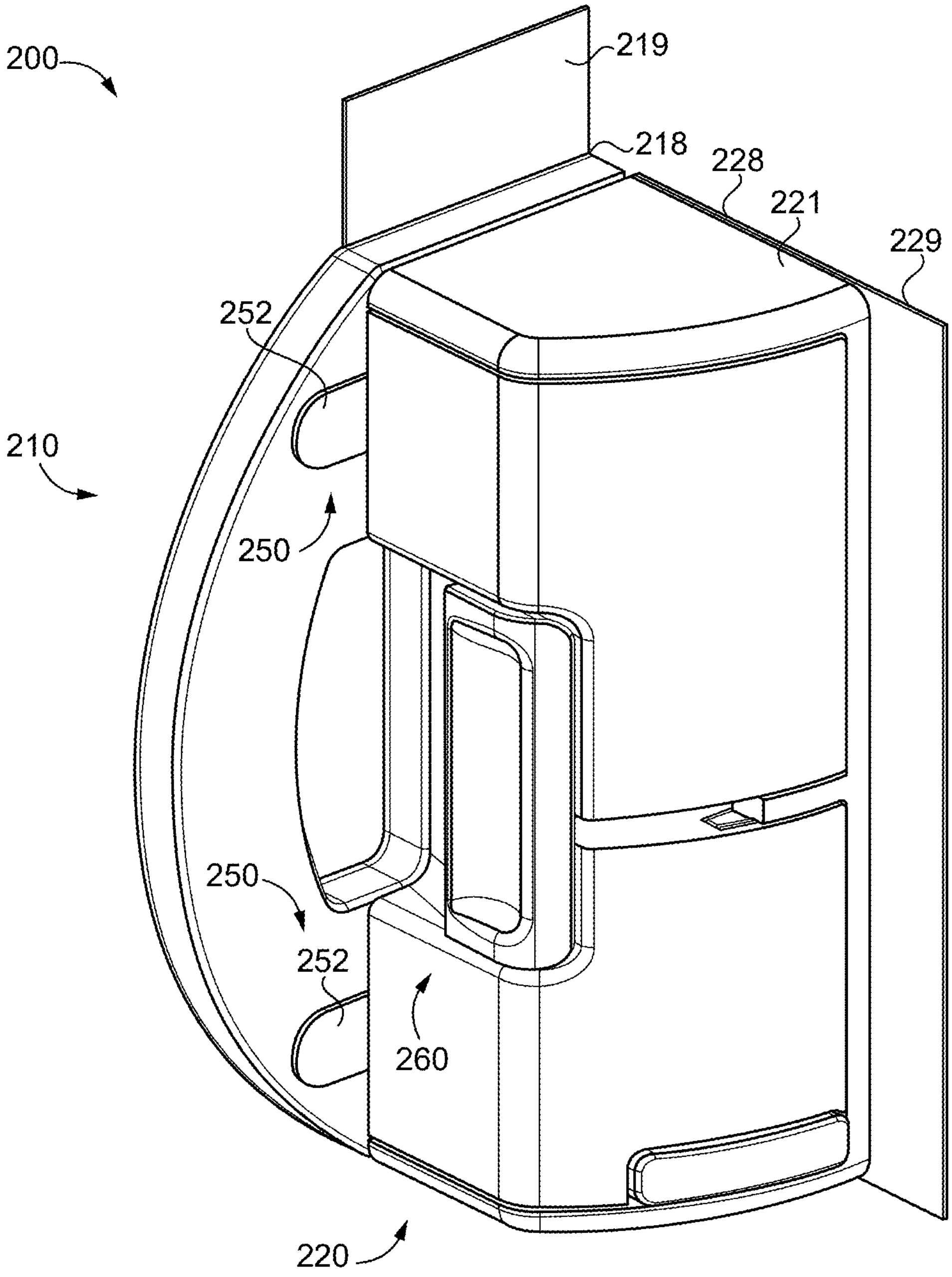
FIG. 5 is a perspective illustration of a pre-aligned locking assembly according to certain embodiments.
Figure 6:
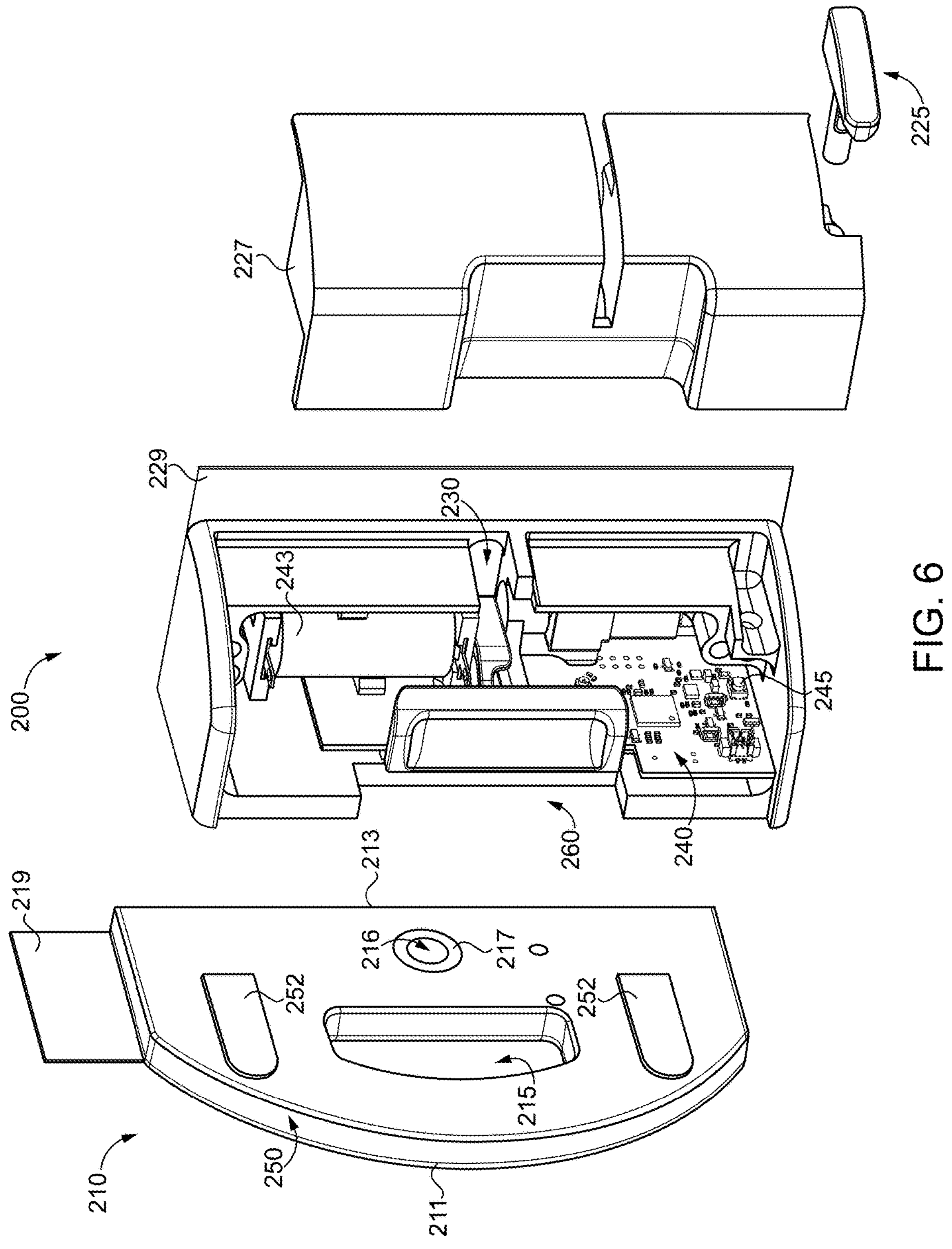
FIG. 6 is a partially-exploded assembly view of the locking assembly illustrated in FIG. 5.
Figure 7:
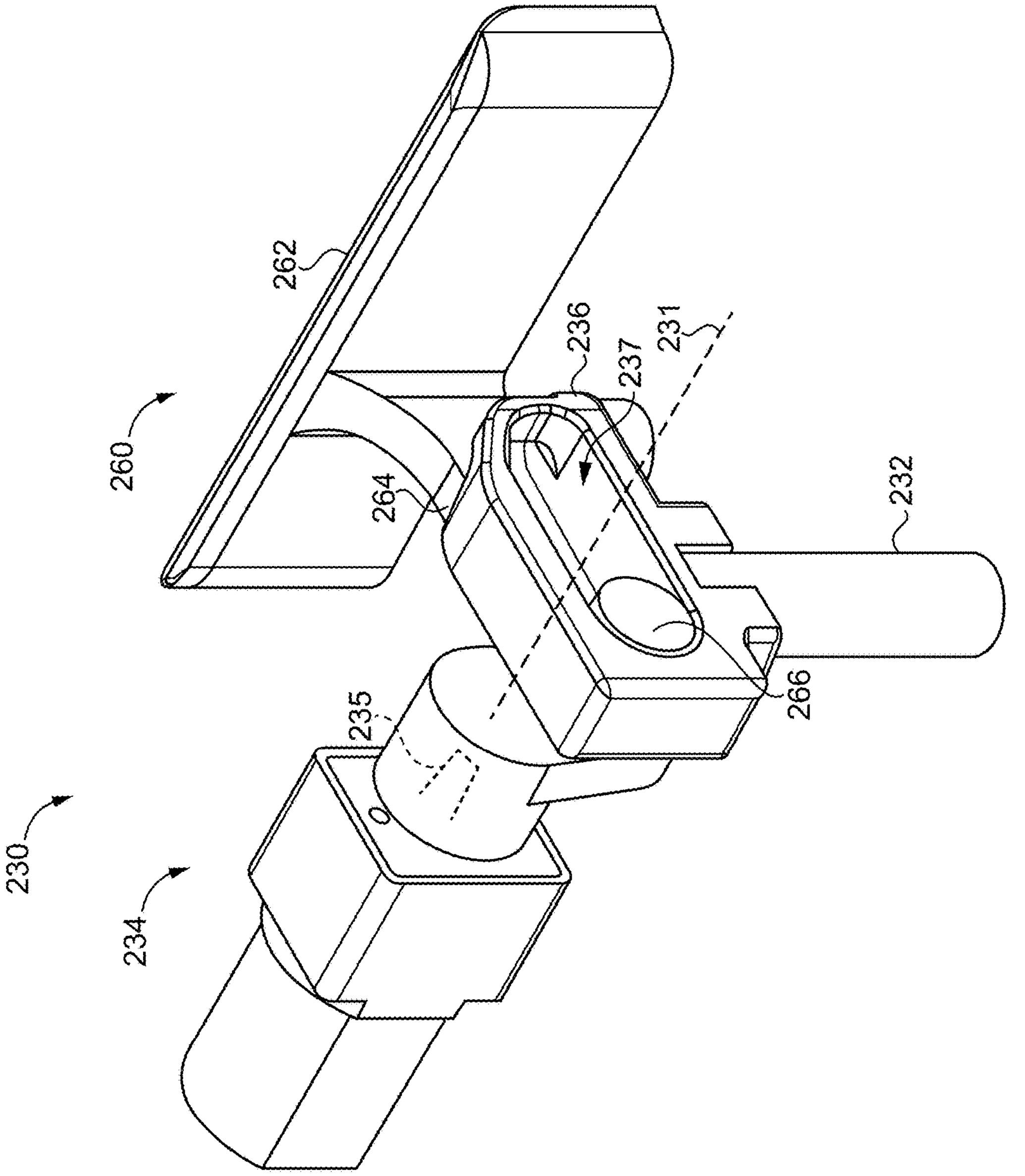
FIG. 7 is a perspective view of a locking mechanism of the locking assembly illustrated in FIG. 5.

With additional reference to FIGS. 5-7, illustrated therein is a pre-aligned locking assembly 200, which is one example of the above-described locking assembly 100. Accordingly, similar reference characters are used to indicate similar elements and features. For example, the locking assembly 200 includes a strike plate 210, a lock module 220 including a locking mechanism 230 and a control assembly 240, and a releasable coupler 250, which respectively correspond to the strike plate 110, lock module 120, locking mechanism 130, control assembly 140, and releasable coupler 150 described above. In the interest of conciseness, the following description of the locking assembly 200 focuses primarily on elements and features that are different from those described above or that were not specifically described above with reference to the locking assembly 100. It is to be appreciated, however, that features described with specific reference to only one of the locking assemblies 100, 200 may nonetheless be present in the other of the locking assemblies 100, 200.

In the strike plate 210, the pocket 216 may be defined at least in part by a bushing 217 operable to receive the bolt 232. The bushing 217 may, for example, be formed of plastic. The inner diameter of the bushing 217 corresponds to the outer diameter of the bolt 232 such that the bushing 217 closely receives the extended bolt 232, thereby preventing pivoting of the bolt 232 when the locking assembly 200 is in the locked condition. This close engagement or tight fit is significant because the plate 210 typically needs to be relatively thin to allow the movable panel 90 to pass over the strike plate 210. As such, engagement between the bolt 232 and the bushing 217 in the depth direction is limited. If the fit between the bushing 217 and the bolt 232 were loose, the bolt 232 may be able to pivot and slip out of the pocket at a much lower force. In certain forms, the tight fit may be provided in only the horizontal directions (i.e., the direction along which the movable panel 90 slides). For example, while the illustrated pocket 216 is formed as an aperture that closely receives the bolt 232 on all sides, it is also contemplated that the pocket 216 may be provided as a vertical slot that closely engages the bolt 232 on the horizontally-facing sides of the bolt 232.

In the illustrated embodiment, the strike plate 210 is substantially D-shaped, and has a curved edge 211 and a straight edge 213. When installed to the closure assembly 70, the curved edge 211 projects in the direction in which the bolt 232 urges the strike plate 210 when a user attempts to open the door while the locking assembly 200 is in the locking state. The "D" shape aids in dispersing the cleavage forces acting on the strike plate 210, thereby providing the strike plate 210 with greater resistance to cleavage than if the strike plate 210 were of another shape, such as rectangular. In certain forms, the curved edge 211 may be centered about the pocket 216 such that when the bolt 232 is received in the pocket 216, the strike plate 210 resists movement of the bolt 232 equally in all directions extending from the pocket 216 to the curved edge 211.

In the lock module 220, the housing 221 includes a cover 227, and a push member 225 is movably mounted to the housing 221 such that depression of the push member 225 actuates the button 245 of the control assembly 240. As noted above, activating the button 245 may cause the locking assembly 200 to begin a relock operation, either immediately, after a predetermined delay time has elapsed, or after a door position sensor indicates that the bolt 232 has become aligned with the pocket 216.

As with the above-described locking mechanism 130, the current locking mechanism 230 includes a bolt 232 and a motor 234 operable to drive the bolt 232 between its extended or locking position and its retracted or unlocking position. The locking mechanism 230 further includes a handle 260 and a yoke 236, which are operably connected between the motor 234 and the bolt 232 in the manner described hereinafter.

The handle 260 generally includes a body portion 262 that is positioned outside the housing 221 and is operable to be manually grasped by a user. In certain forms, the strike plate 210 may include a window 215 to provide additional clearance for a user's fingers when grasping the handle 260. Extending from the body portion 262 is an arm 264 that is mounted to the motor shaft 235 such that the handle 260 is pivotable about a pivot axis 231 defined by the shaft 235. The arm 264 includes a boss 266 that is offset from the pivot axis 231 and is engaged with the yoke 236, which is coupled with the bolt 232. More particularly, the boss 266 extends into an elongated slot 237 defined by the yoke 236 such that pivoting of the handle 260 about the pivot axis 231 causes the bolt 232 to move between its extended locking position and its retracted unlocking positon. As will be appreciated, such pivoting of the handle 260 can be accomplished either manually (e.g., by a user grasping the body portion 262) or electronically (e.g., by the control assembly 240 actuating the motor 234).

Figure 8:
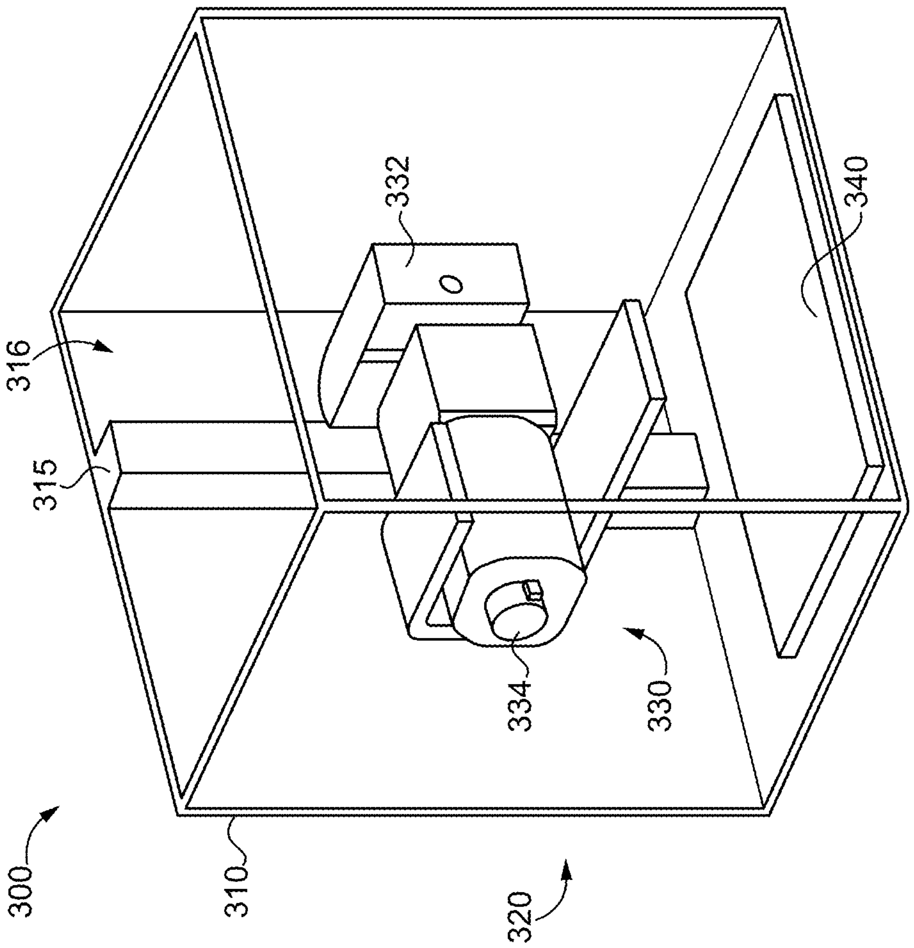
FIG. 8 is a perspective illustration of a pre-aligned locking assembly according to certain embodiments.

With additional reference to FIG. 8, illustrated therein is a pre-aligned locking assembly 300, which is another example of the above-described locking assembly 100, and which is somewhat similar to the above-described locking assembly 200. Accordingly, similar reference characters are used to indicate similar elements and features. For example, the locking assembly 300 includes a strike plate 310 and a lock module 320 including a locking mechanism 330 and a control assembly 340, which respectively correspond to the strike plates 110, 210, the lock modules 120, 220, the locking mechanisms 130, 230, and the control assemblies 140, 240. In the interest of conciseness, the following description of the locking assembly 300 focuses primarily on elements and features that are different from those described above or that were not specifically described above with reference to the locking assemblies 100. It is to be appreciated, however, that features described with specific reference to one of the locking assemblies 100, 200, 300 may nonetheless be present in the another of the locking assemblies 100, 200, 300.

In the current embodiment, the strike plate 310 comprises a vertical ridge 315 that at least partially defines the pocket 316. Additionally, the bolt 332 is directly mounted to the shaft of the motor 334 such that the motor 334 is operable to rotate the bolt 332 between its locking position and its unlocking position. The motor 334 may, for example, rotate the bolt 332 by about 90° between its locking position and its unlocking position. While not specifically illustrated in FIG. 8, it is to be appreciated that the locking assembly 300 may nonetheless include a releasable coupler configured to maintain alignment between the bolt 332 and the pocket 316 until the time of installation.

Figure 9:
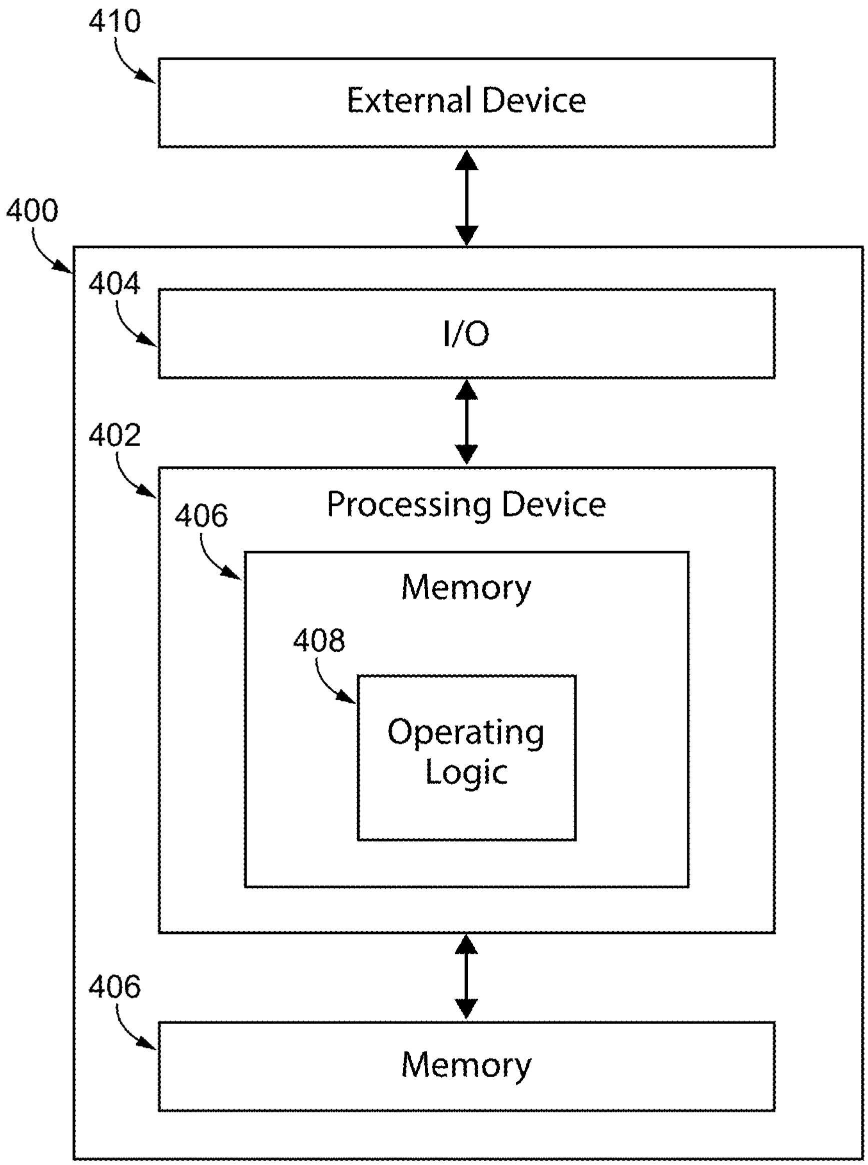
FIG. 9 is a schematic block diagram of a computing device.

Referring now to FIG. 9, a simplified block diagram of at least one embodiment of a computing device 400 is shown. The illustrative computing device 400 depicts at least one embodiment of a locking assembly or control assembly that may be utilized in connection with the locking assemblies 100, 200, 300 and/or control assemblies 140, 240, 340 illustrated in the Figures.

Depending on the particular embodiment, the computing device 400 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as the locking assembly 100, 200, 300, the control assembly 140, 240, 340, and/or an external device 190 such as an access control system 192, a smart home system 194, a mobile device 196, and/or a credential 198. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is of a programmable variety that executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable variety, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As illustrated, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 9, it should be appreciated that a particular computing device 400 may include multiple processing devices 402, I/O devices 404, and/or memories 406 in other embodiments. Further, in some embodiments, more than one external device 410 may be in communication with the computing device 400.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as “a,” “an,” “at least one,” or “at least one portion” are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:

releasably joining a strike plate to a lock module in a pre-aligned state to form a pre-aligned locking assembly configured for installation to first and second surfaces of a door closure assembly;

adhering the strike plate to the first surface of the door closure assembly;

adhering the lock module to the second surface of the door closure assembly; and subsequent to installation of the pre-aligned locking assembly to the door closure assembly, selectively releasing the strike plate from the lock module.

2. The method of claim 1, wherein the strike plate includes a pocket and the lock module includes a bolt movable between a retracted position and an extended position; and wherein the aligning the strike plate with the lock module in the pre-aligned state comprises aligning the pocket with the bolt such that the bolt is operable to extend into the pocket when in the extended position.

3. The method of claim 1, wherein the strike plate and the lock module are releasably joined via a releasable coupler to form the pre-aligned locking assembly.

4. The method of claim 3, wherein the releasable coupler selectively releases the strike plate from the lock module subsequent to the installation of the pre-aligned locking assembly to the door closure assembly.

5. The method of claim 3, wherein the releasable coupler comprises a removable double-sided adhesive strip; and wherein releasably joining the strike plate and the lock module via the releasable coupler comprises:

adhering a first adhesive side of the removable double-sided adhesive strip to the strike plate; and adhering a second adhesive side of the removable double-sided adhesive strip to the lock module.

6. The method of claim 5, wherein the removable double-sided adhesive strip comprises a layer of foam between the first adhesive side and the second adhesive side.

7. The method of claim 1, wherein the door closure assembly comprise a sliding door assembly including a doorframe, a first panel mounted to the doorframe, and a second panel mounted to the doorframe;

wherein at least one of the first panel or the second panel is slidable relative to the doorframe; and wherein installation of the pre-aligned locking assembly to the door closure assembly comprises:

adhering, with a first adhesive, a first surface of the strike plate to the first panel; and adhering, with a second adhesive, a first surface of the lock module to the second panel.

8. The method of claim 7, wherein the first panel comprises a first frame and a first glass pane mounted in the first frame;

wherein the second panel comprises a second frame and a second glass pane mounted in the second frame;

wherein adhering the first surface of the strike plate to the first panel comprises adhering the first surface of the strike plate to the first glass pane; and wherein adhering the first surface of the lock module to the second panel comprises adhering the first surface of the lock module to the second frame.

9. The method of claim 1, wherein the door closure assembly comprises an existing door closure assembly mounted to a door frame; and further comprising retrofitting the existing door closure assembly with the locking assembly via installation of the pre-aligned locking assembly to the existing door closure assembly.

10. A locking assembly for a door closure assembly, the locking assembly comprising:

a strike plate configured to be adhered to a first surface of the door closure assembly; and a lock module configured to be adhered to a second surface of the door closure assembly;

wherein the strike plate and the lock module are releasable joined to one another in a pre-aligned state to form a pre-aligned locking assembly configured for installation to the first and second surfaces of the door closure assembly via adhesion of the strike plate to the first surface and adhesion of the lock module to the second surface; and wherein the strike plate and the lock module are selectively releasable from one another subsequent to the installation of the pre-aligned locking assembly to the door closure assembly.

11. The locking assembly of claim 10, wherein the strike plate includes a pocket and the lock module includes a bolt movable between a retracted position and an extended position; and wherein when the strike plate and the lock module are in the pre-aligned state, the pocket is aligned with the bolt such that the bolt is operable to extend into the pocket when in the extended position.

12. The locking assembly of claim 10, wherein the strike plate and the lock module are releasably joined to one another via a releasable coupler to form the pre-aligned locking assembly; and wherein the releasable coupler selectively releases the strike plate from the lock module subsequent to the installation of the pre-aligned locking assembly to the door closure assembly.

13. The locking assembly of claim 12, wherein the releasable coupler comprises a removable double-sided adhesive strip; and wherein the strike plate is releasably joined to the lock module by:

adherence of a first adhesive side of the removable double-sided adhesive strip to the strike plate; and adherence of a second adhesive side of the removable double-sided adhesive strip to the lock module.

14. The locking assembly of claim 13, wherein the removable double-sided adhesive strip comprises a layer of foam between the first adhesive side and the second adhesive side.

15. The locking assembly of claim 13, wherein the removable double-sided adhesive strip comprises a first removable protective film covering the first adhesive side, and a second removable protective film covering the second adhesive side.

16. The locking assembly of claim 10, wherein the door closure assembly comprise a sliding door assembly including a doorframe, a first panel mounted to the doorframe, and a second panel mounted to the doorframe;

wherein at least one of the first panel or the second panel is slidable relative to the doorframe; and wherein installation of the pre-aligned locking assembly to the door closure assembly comprises:

adherence of a first surface of the strike plate to the first panel; and adherence of a first surface of the lock module to the second panel.

17. The locking assembly of claim 16, wherein with the strike plate adhered to the first panel and the lock module adhered to the second panel, selectively releasing the strike plate from the lock module.

18. A retrofit locking assembly for installation to an existing door closure assembly mounted to a door frame, the retrofit locking assembly comprising:

a strike plate configured to be adhered to a first surface of the exiting door closure assembly; and a lock module configured to be adhered to a second surface of the existing door closure assembly;

wherein the strike plate and the lock module are releasable joined to one another in a pre-aligned state to form a pre-aligned locking assembly configured for installation to the first and second surfaces of the existing door closure assembly via adhesion of the strike plate to the first surface and adhesion of the lock module to the second surface; and wherein the strike plate and the lock module are selectively releasable from one another subsequent to the installation of the pre-aligned locking assembly to the existing door closure assembly.

19. The retrofit locking assembly of claim 18, wherein the strike plate includes a pocket and the lock module includes a bolt movable between a retracted position and an extended position; and wherein when the strike plate and the lock module are in the pre-aligned state, the pocket is aligned with the bolt such that the bolt is operable to extend into the pocket when in the extended position.

20. The retrofit locking assembly of claim 18, wherein the strike plate and the lock module are releasably joined to one another via a releasable coupler to form the pre-aligned locking assembly; and wherein the releasable coupler selectively releases the strike plate from the lock module subsequent to the installation of the pre-aligned locking assembly to the door closure assembly.

* * * * *